United States Patent
Sipilä et al.

(10) Patent No.: US 9,228,428 B2
(45) Date of Patent: Jan. 5, 2016

(54) SYSTEM AND METHOD FOR MONITORING TUBULAR COMPONENTS OF A SUBSEA STRUCTURE

(71) Applicant: General Electric Company, Schenectady, NY (US)

(72) Inventors: Pekka Tapani Sipilä, Munich (DE); Nicholas Josep Ellson, Bristol (GB); Marko Klaus Baller, Saarbruecken (DE); Parag Vyas, Nottingham (GB)

(73) Assignee: General Electric Company, Niskayuna, NY (US)

( * ) Notice: Subject to any disclaimer, the term of this patent is extended or adjusted under 35 U.S.C. 154(b) by 250 days.

(21) Appl. No.: 13/726,667

(22) Filed: Dec. 26, 2012

(65) Prior Publication Data

US 2014/0174752 A1 Jun. 26, 2014

(51) Int. Cl.
  *E21B 47/00* (2012.01)
  *G01M 5/00* (2006.01)
  *G01M 3/40* (2006.01)

(52) U.S. Cl.
  CPC ......... *E21B 47/0006* (2013.01); *G01M 5/0025* (2013.01); *G01M 5/0041* (2013.01); *G01M 5/0091* (2013.01); *G01M 3/40* (2013.01)

(58) Field of Classification Search
  CPC ... E21B 47/0006; E21B 47/0001; G01L 1/12; G01M 5/0025
  USPC .................. 702/34, 35, 41–43; 701/116, 6, 9; 166/351, 353, 354, 355, 359, 367
  See application file for complete search history.

(56) References Cited

U.S. PATENT DOCUMENTS

| | | | |
|---|---|---|---|
| 3,115,774 A * | 12/1963 | Kolb | 73/152.03 |
| 3,402,601 A * | 9/1968 | Heineman | 73/862.392 |
| 5,065,631 A * | 11/1991 | Ashpitel et al. | 73/849 |
| 5,492,017 A | 2/1996 | Jennings et al. | |
| 5,703,298 A | 12/1997 | Odachi et al. | |
| 6,037,767 A | 3/2000 | Crescenzo et al. | |
| 6,513,596 B2 | 2/2003 | Wester | |
| 6,917,196 B2 | 7/2005 | Kwun et al. | |
| 7,328,741 B2 | 2/2008 | Allen et al. | |
| 7,646,945 B2 | 1/2010 | Jones et al. | |
| 7,721,611 B2 | 5/2010 | Salama | |

(Continued)

FOREIGN PATENT DOCUMENTS

CA 2463019 A1 * 10/2004

OTHER PUBLICATIONS

Hegeon Kwun et al.; Recent Developments in Nondestructive Evaluation of Steel Strands and Cables using Magnetostrictive Sensors; Oceans '96. MTS/IEEE., Prospects for the 21st Century Conference Proceedings; vol. 1; Sep. 23-26, 1996; pp. 144-148.

*Primary Examiner* — James G Sayre
(74) *Attorney, Agent, or Firm* — Seema S. Katragadda (57) ABSTRACT

A system for monitoring a subsea structure is presented. The system includes a sensor disposed on or about one or more tubular components of the subsea structure, where the one or more tubular components of the subsea structure include a riser, a flow-line, and a subsea umbilical. Moreover, the system includes a controller operatively coupled to the one or more tubular components of the subsea structure and configured to detect an anomaly in the one or more tubular components of the subsea structure. A method for monitoring the subsea structure is also presented.

23 Claims, 7 Drawing Sheets

(56) References Cited

U.S. PATENT DOCUMENTS

| | | | |
|---|---|---|---|
| 7,876,096 B2 | 1/2011 | Buttle et al. | |
| 8,020,455 B2 | 9/2011 | Sihler et al. | |
| 8,547,539 B2* | 10/2013 | Ramos et al. | 356/73.1 |
| 2004/0035216 A1* | 2/2004 | Morrison et al. | 73/800 |
| 2005/0100414 A1* | 5/2005 | Salama | 405/224.2 |
| 2005/0283276 A1 | 12/2005 | Prescott et al. | |
| 2007/0193363 A1* | 8/2007 | Allen et al. | 73/825 |
| 2008/0249720 A1* | 10/2008 | Salama | 702/42 |
| 2009/0169380 A1 | 7/2009 | Nies et al. | |
| 2009/0301224 A1* | 12/2009 | Sihler et al. | 73/862.333 |
| 2010/0089478 A1* | 4/2010 | Gudme | 138/104 |
| 2010/0236339 A1 | 9/2010 | Buttle et al. | |
| 2011/0163890 A1 | 7/2011 | Bowles et al. | |
| 2011/0259115 A1* | 10/2011 | Roberts et al. | 73/800 |
| 2012/0031620 A1* | 2/2012 | Phadke | 166/336 |

\* cited by examiner

SYSTEM AND METHOD FOR MONITORING TUBULAR COMPONENTS OF A SUBSEA STRUCTURE

BACKGROUND

Embodiments of the present disclosure generally relate to monitoring of subsea structures, and more specifically to monitoring of pressure and/or stress in risers, pipes, and flow-lines of the subsea infrastructure.

In subsea hydrocarbon production, risers are utilized to deliver fluid from the subsea well to a collecting asset, such as a production vessel or an injection fluid to the subsea well from the production vessel. Also, during subsea drilling a riser is used to contain the drill pipe and provide a return path for drilling fluid. Typically, risers extend from a seabed to the surface and are subject to bending, twisting, and tensional forces due to currents and movements of the production vessel. Depending on flow parameters such as flow rate, temperature, and consistency, the risers can experience stress build-up due to pressure difference between ambient and a flow channel. In order to ensure effective operation of risers, it is beneficial to continuously monitor the stress experienced by the risers. Also, identifying pressure and/or stress variations aids an operator in ensuring efficient transfer of oil from the subsea well to the collecting asset.

Occasionally, strain sensors such as strain gages and fiber Bragg sensors are employed to sense mechanical stress in the risers. Additionally, pressure sensors may be employed to measure pressure in the flow-lines and the risers. Use of the strain sensors and/or pressure sensors generally entails mechanical coupling with the flow-lines and risers. Extended use of these sensors results in loss of strength of mechanical adhesion of the sensors. Also, the sensors may be subject to harsh environments for extended periods of time. In addition, repair or replacement of sensors may be a challenging task.

Furthermore, the riser and/or the flow-line are generally designed and deployed with a fixed number of sensors disposed at determined locations. However, it may be desirable to either increase the number of sensors on the riser and/or flow-line, or vary the locations of the sensors during the lifetime of the riser and/or flow-line. However, varying the number and/or location of the sensors is an expensive and laborious task.

BRIEF DESCRIPTION

In accordance with aspects of the present disclosure a system for monitoring a subsea structure is presented. The system includes a sensor disposed on or about one or more tubular components of the subsea structure, where the one or more tubular components of the subsea structure include a riser, a flow-line, and a subsea umbilical. Furthermore, the system includes a controller operatively coupled to the one or more tubular components of the subsea structure and configured to detect an anomaly in the one or more tubular components of the subsea structure.

In accordance with another aspect of the present disclosure a method for monitoring a subsea structure is presented. The method includes disposing a sensor on or about one or more tubular components of the subsea structure, where the one or more tubular components of the subsea structure include a riser, a flow-line, and a subsea umbilical, where the sensor is configured to measure a parameter. Also, the method includes analyzing the measured parameter using a controller. In addition, the method includes identifying an anomaly in one or more of the riser, the flow-line, and the subsea umbilical based on analysis of the measured parameter.

In accordance with another aspect of the present disclosure a system is presented. The system includes a monitoring subsystem configured to monitor one or more tubular components of a subsea structure, where the one or more tubular components of the subsea structure include a riser, a flow-line, and a subsea umbilical. The monitoring subsystem includes a sensor disposed on or about the one or more tubular components of the subsea structure and configured to measure a parameter associated with the one or more tubular components of the subsea structure and a controller operatively coupled to the one or more tubular components of the subsea structure and configured to detect an anomaly in the one or more tubular components of the subsea structure. Furthermore, the system includes an energy harvesting unit operatively coupled to the monitoring subsystem and configured to energize the sensor and a communication unit operatively coupled to the monitoring subsystem and configured to transmit or receive the parameter measured by the sensor.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of an exemplary system and method for monitoring a tubular component of a subsea structure such as but not limited to risers, flow-lines, subsea umbilicals, and pipes are presented. Furthermore, since the exemplary system and method utilize a magnetostrictive technique, the sensing is robust against aging, dirt, moisture, changes in the composition of the ambient fluid, and the like.

Figure 1:
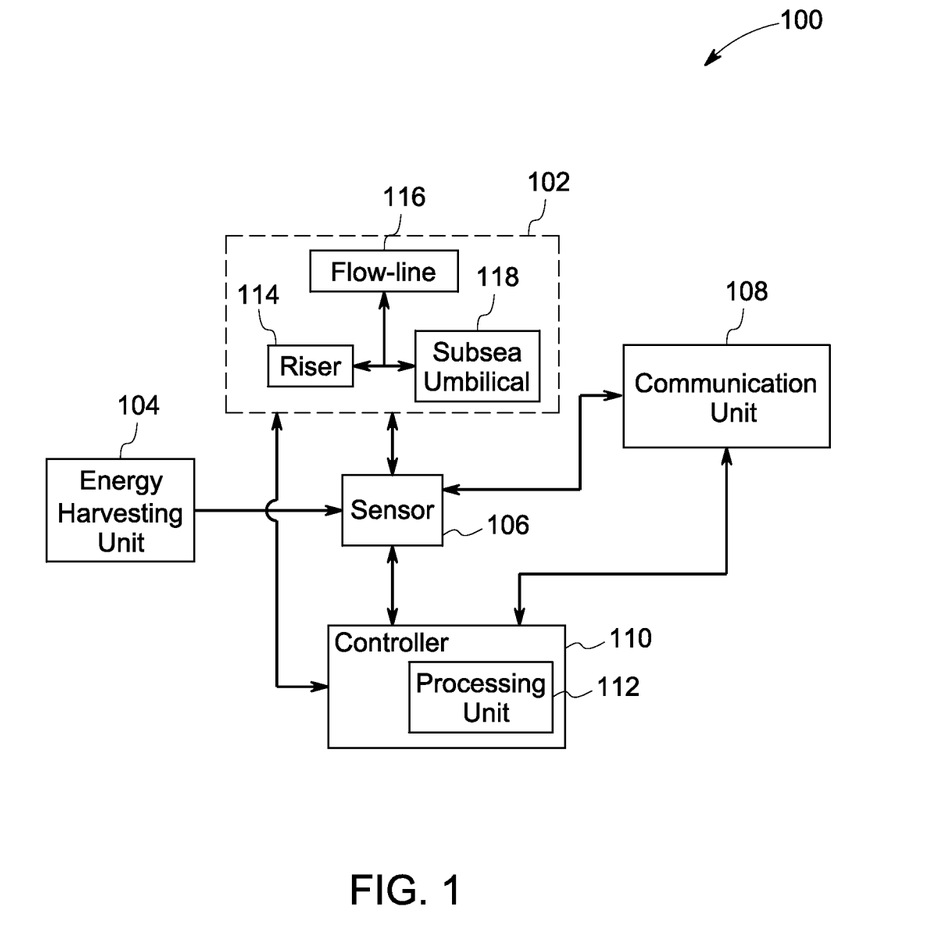
FIG. 1 is a diagrammatical representation of an exemplary system for monitoring tubular components of a subsea structure, in accordance with aspects of the present disclosure.

Turning now to the drawings, by way of example in FIG. 1, an exemplary embodiment of a system 100 for monitoring one or more tubular components of a subsea structure, in accordance with aspects of the present disclosure, is depicted. In one embodiment, the system 100 for monitoring the tubular components of the subsea structure 102 may include an energy harvesting unit 104 and a sensor 106. The system 100 may also include a communication unit 108 and a controller 110. The sensor 106 which is coupled to the subsea structure 102 and the controller 110 may generally be referred to as a monitoring subsystem. The monitoring subsystem may be configured to monitor one or more tubular components of the subsea structure 102. In one embodiment, power to the communication unit 108 may be supplied using the energy harvesting unit 104. The tubular components of the subsea structure 102 may include a riser 114, a flow-line 116, a subsea umbilical 118, and the like. In one example, the subsea umbilical may include a plurality of tubes. The flow-lines 116 are typically submarine pipelines configured to carry oil and gas products from a subsea wellhead to a foot of the riser 114. Also, the flow-lines 116 may include jumpers and other subsea pipes. In addition, the riser 114 is typically connected to a production and/or drilling facility above the sea water surface and is configured to transfer fluids. The fluids may include oil, hydrocarbons, and the like, in one example. Also, the riser 114 may be rigid or flexible. Moreover, the riser is employed primarily for vertical transportation. Furthermore, the subsea umbilical 118 is deployed between a production and/or drilling facility and a subsea facility to supply necessary controls and chemicals to subsea wells.

The energy harvesting unit 104 may be configured to generate electricity using vibrations of the one or more tubular components of the subsea structure 102 and/or temperature variations of the one or more tubular components of the subsea structure 102. The temperature variations of the one or more tubular components of the subsea structure 102 may include a difference in temperature along the one or more tubular components of the subsea structure 102, a difference in temperature between the one or more tubular components of the subsea structure 102 and seawater, or a combination thereof. Also, in another example, the energy harvesting unit 104 may be configured to generate electricity using light, motion of sea water, microbiological techniques, and the like. In one example, the light used for generating electricity may include solar radiation. Moreover, in one non-limiting example, the energy harvesting unit 104 may include a battery, a direct current source, an alternating current source, and the like. Furthermore, the energy harvesting unit 104 may be operatively coupled to the sensor 106 and may be configured to energize the sensor 106.

Furthermore, in one embodiment, the sensor 106 may be disposed on or about the riser 114, the flow-line 116, the subsea umbilical 118, and/or other tubular components of subsea structures. In particular, the sensor 106 may be disposed on the outer periphery of the riser 114, the flow-line 116, the subsea umbilical 118, and the other tubular components of the subsea structure 102. The sensor 106 may be configured to measure/sense a parameter. The term parameter, as used herein, may include a pressure, a load, compression stress, residual stress, longitudinal stress, tensional stress, bending stress, torque induced stress, a flow property of a production fluid, or combinations thereof.

Additionally, the communication unit 108 may be operatively coupled to the sensor 106. The communication unit 108 may be configured to transmit and/or receive a parameter measured/determined by the sensor 106. Moreover, in one non-limiting example, the communication unit 108 may be disposed at a remote location. In another example, the communication unit 108 may be placed on or about the riser 114, the flow-line 116, the subsea umbilical 118, and other tubular components of the subsea structures. Also, the communication unit 108 may include electronic circuitry such as a transmitter, a receiver, and the like. Furthermore, in one non-limiting example, the transmitter of the communication unit 108 may be disposed on or about the riser 114, the flow-line 116, the subsea umbilical 118, and the other tubular components of the subsea structures, while the receiver of the communication unit 108 may be disposed at a remote location. Furthermore, the energy harvesting unit 104 and the communication unit 108 may be operatively coupled to the sensor 106 using a wired connection, a wireless connection, and the like.

In addition, the controller 110 may be a subsea control module (SCM). Although, the embodiment of FIG. 1 depicts the communication unit 108 and the controller 110 as separate units, in certain embodiments, the controller 110 may include the communication unit 108. Furthermore, the controller 110 may be operatively coupled to the communication unit 108. The parameter measured by the sensor 106 may be communicated by the communication unit 108 to the controller 110.

In one embodiment, the controller 110 may include a processing unit 112. The processing unit 112 may be configured to analyze the parameter measured by the sensor 106. Furthermore, the processing unit 112 may be configured to identify an anomaly in one or more tubular components of the subsea structures 102 based on an analysis of the parameter. Also, the anomaly in one or more tubular components of the subsea structures 102 may include an anomaly in one or more of the riser 114, the flow-lines 116, the subsea umbilical 118, and the like. In addition, based on the identification of the anomaly, the controller 110 may be configured to regulate the pressure, the stress, the flow property and the like, in the riser 114, the flow-line 116, the subsea umbilical 118, and other tubular components of the subsea structure 102. The term anomaly, as used herein, may include a condition that could lead to a fault in one or more of the riser 114, the flow-line 116, and other tubular components of the subsea structure. Additionally, the controller 110 may also be configured to control operation of the sensor 106 that measures pressure, flow, and stress in one or more tubular components of the subsea structures 102.

Also, the sensor 106 may include a magnetic field sensor, a magnetostrictive sensor, a Villari effect sensor, an inductive coil, an acoustic transducer, an optical fiber, a magnetic sensor, or combinations thereof. Moreover, in one embodiment, the sensor 106 may also include a temperature sensor, a humidity sensor, a chemical sensor, and the like. The term operatively coupled, as used herein, includes wired coupling, wireless coupling, electrical coupling, magnetic coupling, capacitive coupling, optical coupling, radio communication, software based communication, or combinations thereof.

Figure 2:
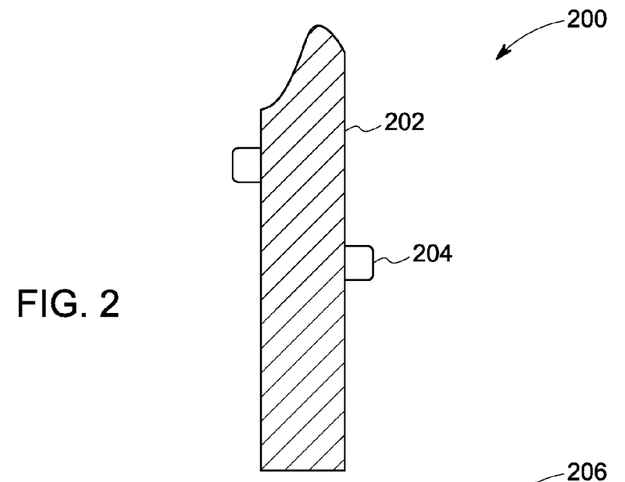
FIGS. 2-4 are diagrammatical representations of exemplary embodiments of a portion of the system of FIG. 1, according to aspects of the present disclosure.
Figure 3:
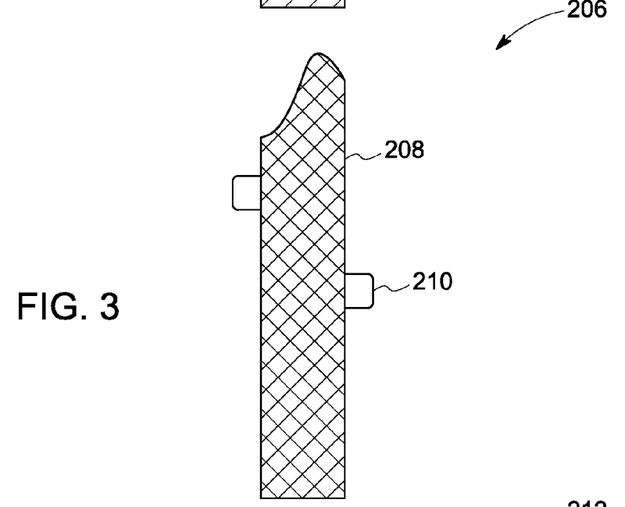
Figure 4:
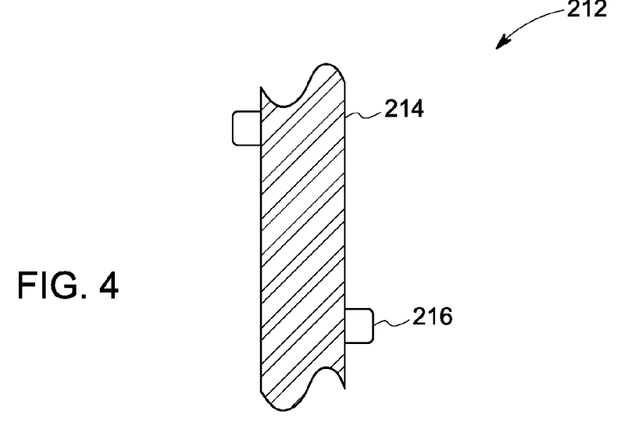

Referring now to FIGS. 2-4, diagrammatical representations 200, 206, 212 of exemplary embodiments of a portion of a system for monitoring the tubular components of a subsea structure, such as the system 100 of FIG. 1 is depicted. In particular, FIGS. 2-4 are diagrammatical representations of a portion of tubular components of the subsea structure, such as the tubular components of the subsea structure 102 of FIG. 1.

FIG. 2 is a diagrammatical representation 200 of a riser 202, such as the riser 114 of FIG. 1. As depicted in FIG. 2, a sensor 204 such as the sensor 106 of FIG. 1 may be disposed on an outer periphery of the riser 202.

Furthermore FIG. 3 is a diagrammatical representation 206 of a portion of a flow-line 208, such as the flow-line 116 of FIG. 1. Reference numeral 210 is representative of a sensor disposed on the outer periphery of the flow-line 208.

Turning now to FIG. 4, a diagrammatical representation 212 of a portion of a subsea umbilical 214, such as the subsea umbilical 118 is depicted. Also, a sensor 216 is disposed on an outer periphery of the subsea umbilical 214. It may be noted that although the embodiments of FIGS. 2-4 depict the sensors 204, 210, 216 as being disposed on the outer periphery of the riser 202, the flow-line 208, and the subsea umbilical 214, respectively, the sensors may also be disposed in close proximity to the riser 202, the flow-line 208, and the subsea umbilical 214.

It may be noted that stress experienced by the tubular components of the subsea structure is a linear function of a difference in pressure between inside of a tubular component and pressure outside of the tubular component of the subsea structure. In one example, stress may include the hoop stress. Accordingly, any variation in the pressure in the flow-line 208, the riser 202, and the tubes within the subsea umbilical 214 may result in variation in stress of the flow-line 208, the riser 202, and/or the tubes within the subsea umbilical 214. This stress may be captured by the sensors 204, 210, 216 disposed on the flow-line 208, the riser 202, and/or the subsea umbilical 214. Also, the stress experienced by the flow-line 208, the riser 202, and/or the subsea umbilical 214 may be a combination of residual stress, applied stress, bending stress, and stress due to stretching and compression. In addition, for the riser 202 other parameters, such as, but not limited to, wall thickness of the riser 202, internal diameter of the riser 202, Young's modulus, and Poisson's ratio of the material of the riser 202 may also be employed in the calculation of stress. Similarly, stress may be calculated for the flow-line 208 and the subsea umbilical 214.

Figure 5:
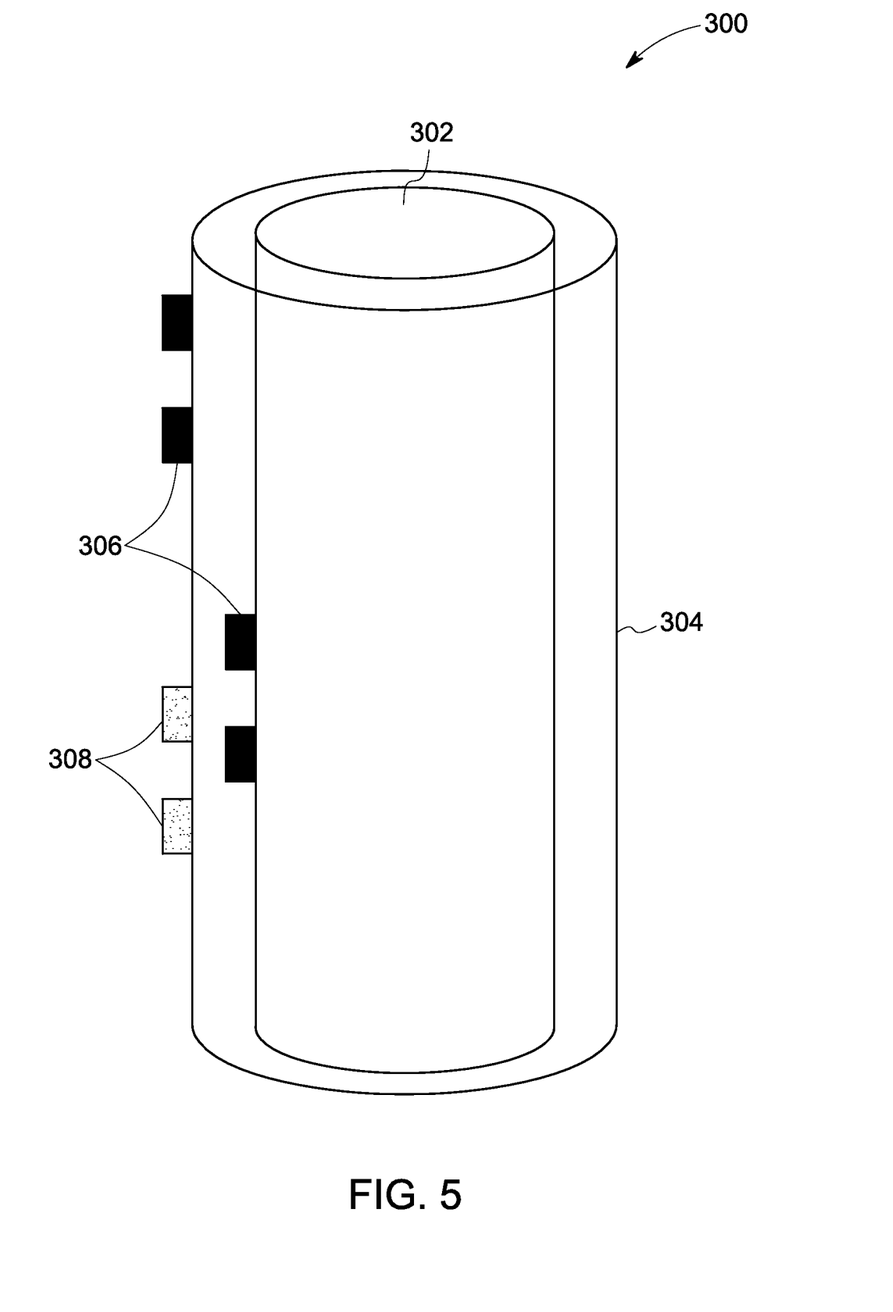
FIG. 5 is a diagrammatical representation of another exemplary embodiment of a portion of the exemplary system of FIG. 1, according to aspects of the present disclosure.

Turning now to FIG. 5, a diagrammatical representation 300 of another exemplary embodiment of a portion of an exemplary system 100 of FIG. 1, according to aspects of the present disclosure, is presented. Particularly, FIG. 5 depicts use of a sensor, such as an inductive coil on or about a tubular component of the subsea structure, such as, but not limited to, a flow-line, a riser, and a subsea umbilical. The system 300 may include a tubular component of the subsea structure such as a riser 302. In the present example, the riser 302 may include a coating 304 disposed on the outer periphery of the riser 302. Furthermore, the system 300 may include a sensor such as the inductive coil 306 disposed on the outer periphery of the riser 302. In addition, the sensor 302 may also be disposed on the outer periphery of the coating 304. In one example, the coating 304 may include a polymer coating such as a polyurethane coating. However, a cement coating may also be employed. Moreover, the inductive coil 306 may be energized by employing an alternating current and this in turn may induce a magnetic field in the riser 302. In the example of FIG. 5, the inductive coils 306 may be magnetically coupled to the riser 302.

It may be noted that any anomaly in one or more tubular component of a subsea structure such as the riser 302 may result in a substantial variation of pressure in the riser 302. In one example, an excessive motion at a sea surface may result in high tensional loads and/or stress causing the riser material to yield and burst. This bursting of the riser 302 may lead to a drop in pressure in the riser 302. In an alternative example, a leak may be caused in the riser 302 due to erosion. This leak may in turn cause a drop in pressure in the riser 302, thereby resulting in a decrease in pressure in the riser 302. These variations in the pressure in the riser 302 may be manifested in the form of stress on the riser 302. The stress experienced by the riser 302 may result in changes in the magnetostrictive property of the riser 302, thereby causing variation in the magnetic field induced in the riser 302. This variation in the induced magnetic field and consequently the stress experienced by the riser 302 may be detected by the inductive coils 306. In one example, the stress detected by the inductive coil 306 may also be referred to as a parameter.

Moreover, the inductive coils 306 may be operatively coupled to a communication unit, such as the communication unit 108 of FIG. 1. Any measurements may be communicated from the inductive coils 306 to the communication unit. Furthermore, the communication unit may be coupled to a controller, such as the controller 110 of FIG. 1. The controller may be configured to analyze the parameter. Based on the analysis of the parameter, the type of fault in the riser 302 may be determined and/or corrective action may be taken to prevent any fault in the riser 302. Furthermore, in another example, the analysis of parameter may aid in calculating a remaining useful life of the riser 302. In addition, the system 300 of FIG. 5 may include a reference field sensor 308 configured to eliminate or minimize any error due to a background magnetic field. The reference field sensor 308 may be positioned on the coating 304, in one example. It may be noted that the background magnetic field may include natural magnetic fields, fields due to permanent magnetization of components, fields due to moving magnets, fields due to ferromagnetic objects, fields induced by electric currents, or combinations thereof. In one embodiment, the system 300 may also include an auxiliary temperature sensor.

Figure 6:
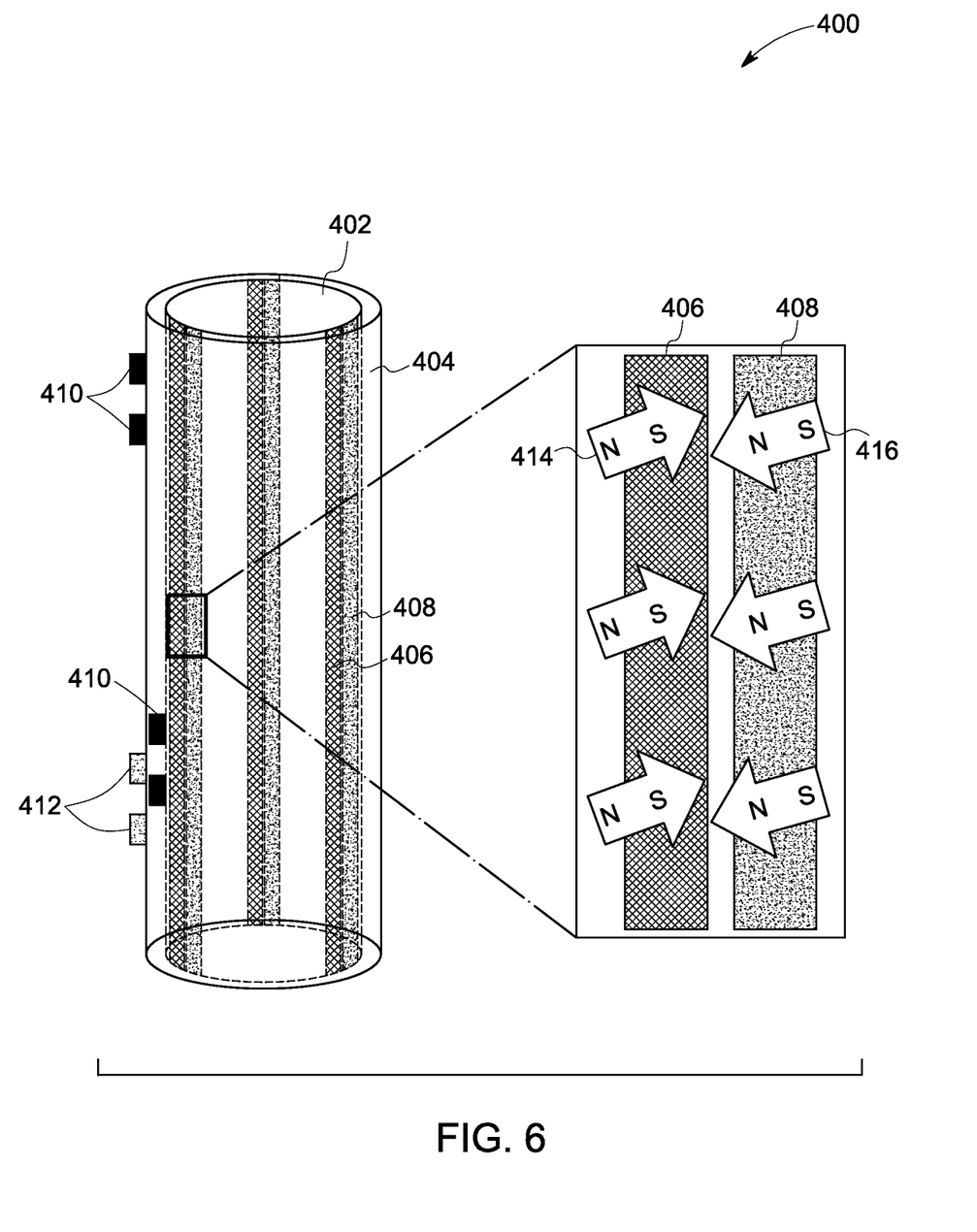
FIG. 6 is a diagrammatical representation of an exemplary magnetization of the tubular components of the subsea structure for use in the system of FIG. 1, according to aspects of the present disclosure.

Referring to FIG. 6, a diagrammatical representation 400 of yet another exemplary embodiment of a portion of the exemplary system 100 for monitoring the one or more tubular components of the subsea structure, according to aspects of the present disclosure, is depicted. The system of FIG. 6 may include a riser 402 having a coating 404 on the outer periphery of the riser 402. As previously noted, the coating 404 may be a cement coating or a polymer coating. In accordance with the aspects of the present disclosure, the riser 402 may include one or more segments with sensing capability. In one example, the segments with sensing capability may include one or more magnetically encoded regions. In the example of FIG. 6, the riser 402 may include one or more magnetically encoded regions. The magnetically encoded regions may include a magnetized line having a first polarity 406 and a magnetized line having a second polarity 408. These magnetized lines having the first and second polarities 406, 408 may be formed using a determined value of electrical current, a determined value of magnetic field, or both. In one embodiment, the magnetized lines 406, 408 may be created on the riser 402 before installation and commissioning of the tubular components of the subsea structure. However, in another example, for magnetizing the riser 402 after installation, the coating 404 may be removed and the riser 402 may be magnetized.

Also, in one non-limiting example, the riser 402 may be configured to behave as a sensor by application of acoustic signals, ultrasound signals, and the like to the riser 402. Furthermore, if the riser 402 is subject to stress due to any anomalies therein, the riser 402 may experience variation in pressure. Also, the stress caused in the riser 402 may cause the magnetostrictive property of the riser 402 to change. This change in the magnetostrictive property of the riser 402 may in turn result in changes in the magnetic field associated with the magnetized lines 406, 408 of the riser 402. The change in the magnetic field may be measured using a magnetic field sensor 410. Moreover, the magnetic field sensor 410 may be placed on the riser 402. In an alternative example, the magnetic field sensor 410 may be placed on the coating 404. It may be noted that the riser 402 with the magnetized lines 406, 408 may also be configured for use as a sensor, in one example.

Also, in one embodiment, the magnetic field sensor 410 may be coupled to the riser 402. In one example, the riser 402 may be made of a high strength metal alloy. Furthermore, the magnetic field sensor 410 may be coupled to the metal surface of the riser 402. In another example, the magnetic field sensor 410 may be disposed in close proximity to metal surface of the riser 402. The magnetic field sensor 410 may be configured to measure a parameter and communicate the measured parameter to a communication unit. Moreover, the parameter may be transmitted from the communication unit to a controller, such as the controller 110 of FIG. 1, for processing. In particular, the controller may be configured to analyze the parameter to detect presence of any anomalies in the riser 402. In one non-limiting example, the analysis of parameter may facilitate identification of a condition that may lead to a fault. The faults in the riser 402 may include an erosion of the riser, a leak in the riser, a rupture in the riser, an increase in load on the riser, and the like. However, in certain other embodiments, the parameter measured by the magnetic field sensor 410 may be transmitted wirelessly to the controller via an inductive pick-up, a radio frequency link, and the like. Furthermore, the system 400 may also include an energy harvesting unit and a communication unit. Also, the power to the magnetic field sensor 410 may be wirelessly communicated/received from the energy harvesting unit. In the example of FIG. 6, reference numeral 412 is representative of a wireless power and communication link to the magnetic field sensor 410. Additionally, use of the magnetic field sensor 410 aids in identification of any anomaly in one or more tubular components of the subsea structure.

Furthermore, the magnetized lines 406, 408 may run along a whole length of the riser 402. In one example, the magnetized lines 406, 408 may be formed along different longitudinal segments of the riser 402. In one example, the magnetized lines 406, 408 along the length of the riser 402 may be discontinuous. In an alternative embodiment, the magnetized line 406, 408 may be in a spiral configuration along the riser 402. Although, magnetization in the longitudinal and spiral configurations is disclosed herein, magnetization of the riser 402 in other orientations is also contemplated. Also, the magnetization of the other tubular components of the subsea structure is also envisaged.

In addition, the magnetized line of first polarity 406 may include magnetization domains 414 having an upward orientation. Also, the magnetized line of the second polarity 408 may include magnetization domains 416 having a different orientation. In one example, the magnetization domains 416 may have a downward orientation. Depending on the magnetoresistance of the metal of the riser 402 and the stress experienced by the metal of the riser 402, the orientation of the magnetization domains 414, 416, may change. In addition to the change in orientation of the magnetization domains 414, 416, material magnetic susceptibility may also change. The change in material magnetic susceptibility may be sensed using magnetic field sensors 410, in one embodiment. Furthermore, the sensing of the change in material magnetic susceptibility may aid in the identification of an anomaly, such as fatigue in the riser 402. In a similar fashion, an anomaly in other components, such as the flow-lines and subsea umbilicals may also be identified.

Figure 7:
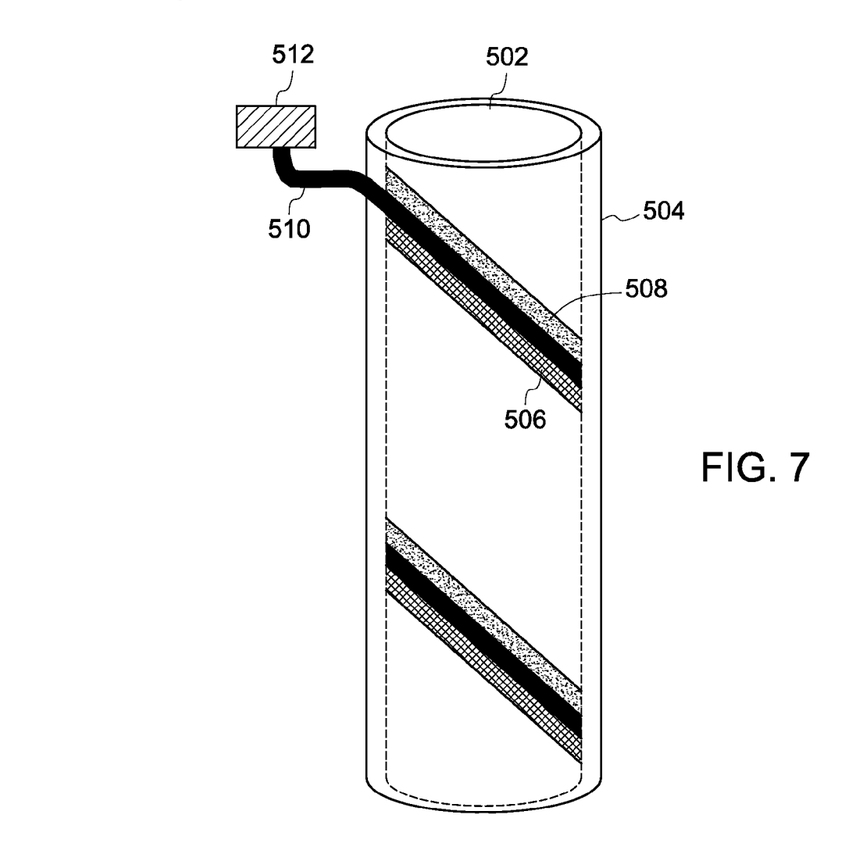
FIG. 7 is a diagrammatical representation of an exemplary optical fiber based sensing of the tubular components of the subsea structure for use in the system of FIG. 1, according to aspects of the present disclosure.

Turning now to FIG. 7, a diagrammatical representation 500 of exemplary optical fiber based sensing of a tubular component of the subsea structure, such as, but not limited to, a riser, according to aspects of the present disclosure, is presented. The system 500 of FIG. 7 may include a riser 502 having a coating 504 on the outer periphery of the riser 502. Furthermore, the riser 502 may include magnetized lines in spiral configuration. The magnetized lines in spiral configuration may include a magnetized line of first polarity 506 and a magnetized line of second polarity 508.

In addition, an optical fiber 510 may be wound in a spiral configuration between the magnetized line of first polarity 506 and the magnetized line of second polarity 508. Also, the optical fiber 510 may be operatively coupled to an optical source and detector unit 512. The optical source and detector unit 512 may be configured to guide light through the optical fiber 510. In addition, the optical source and detector unit 512 may be configured to detect the light emitted by the optical fiber 510.

The optical fiber 510 may be based on a magneto-optical effect. Accordingly, the optical fiber 510 may be sensitive to changes in a magnetic field. Furthermore, the sensitivity of the optical fiber 510 may be increased when the optical fiber 510 is wound between the magnetized line of first polarity 506 and the magnetized line of second polarity 508. The orientation of the magnetization domains in the magnetized lines of first polarity 506 and the magnetized lines of second polarity 508 may change when the riser 502 is subject to stress. As previously noted, the riser 502 may experience a variation in stress as a result of variation of pressure in the riser 502. Also, the variation of pressure in the riser 502 may occur due to an anomaly in the riser 502. As noted hereinabove, the optical fiber 510 is sensitive to changes in a magnetic field and therefore, the optical fiber 510 may be sensitive to changes in the orientation of the magnetization domains, which in turn may affect the signal in the optical fiber. Also, optical properties of the optical fiber 510 may change. Hence, light guided by the optical fiber 510 also changes, which in turn, aids in identifying the stress experienced by the riser 502.

In one embodiment, the optical fiber 510 may be wound in a spiral configuration along the magnetized lines of first polarity 506 and the magnetized lines of second polarity 508. In another embodiment, the optical fiber 510 may be wound in spiral configuration on the outer periphery of the magnetized lines of first polarity 506 and the magnetized lines of second polarity 508. Although, the example of FIG. 7 represents a spiral configuration of winding the optical fiber 510, other configurations of winding of the optical fiber are also contemplated.

Figure 8:
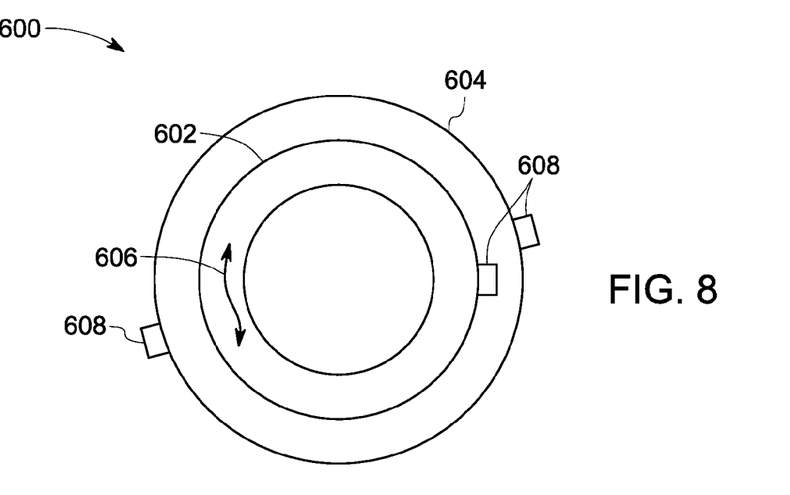
FIG. 8 is a diagrammatical representation of another exemplary embodiment of a portion of the exemplary system of FIG. 1, according to aspects of the present disclosure.

Referring now to FIG. 8, a diagrammatical representation 600, of another exemplary embodiment of a portion of the exemplary system for monitoring tubular components of the subsea structure 100, according to aspects of the present disclosure, is depicted. In particular, FIG. 8 represents a cross-sectional view of a system for acoustic based sensing in a riser. In the example of FIG. 8, the system for acoustic based sensing 600 includes a riser 602 having a coating 604 on the outer periphery of the riser 602. Acoustic sensors 608 may be disposed on the riser 602 and/or the coating 604. As previously noted, the coating 604 may include a cement coating or a polymer coating.

Furthermore, an acoustic signal 606 may be guided through the riser 602. Consequently, the riser 602 may be configured to behave as a sensor. Any anomalies in the riser 602 may result in a variation in pressure in the riser 602, due to variation in pressure in the riser 602 the riser 602 may experience stress. Also, the stress in the riser 602 may cause time of flight of the acoustic signal 606 to vary. Accordingly, the variation in the time of flight of the acoustic signal 606 may be sensed by the acoustic sensors 608 to determine the stress on the riser 602 may be determined. The determined stress may then be analyzed to detect any anomalies in the riser 602. In a similar fashion, anomalies in one or more tubular components of the subsea structure may also be determined. In one non-limiting example, the acoustic sensor 608 may be configured to accept signals within a determined window of time-of-flights, thereby avoiding any unwanted cross-talks and/or interference from any reflected signals. Although the embodiment of FIGS. 2-8 are described with reference to monitoring of the riser, monitoring of the flow-lines, the subsea umbilicals, and other tubular components of the subsea structures is also envisaged.

Figure 9:
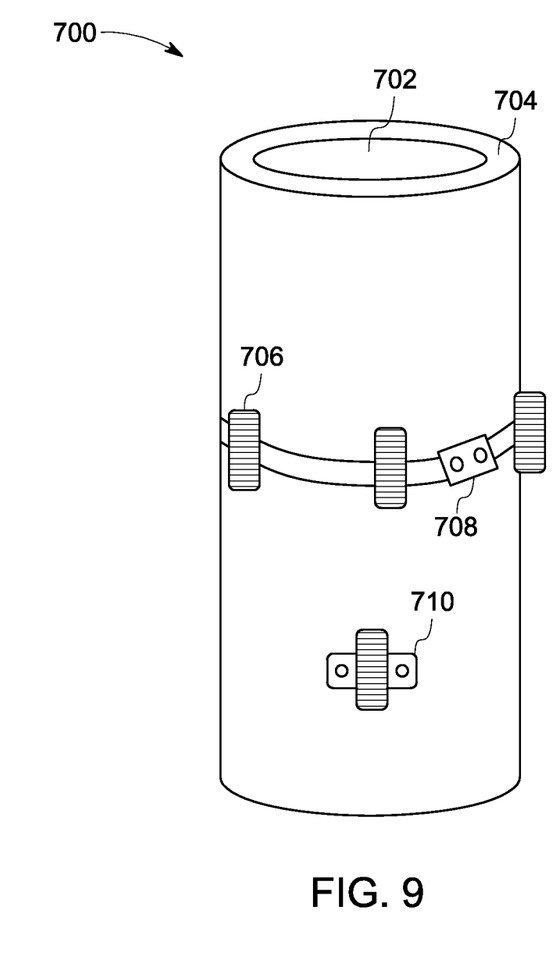
FIGS. 9 and 10 are diagrammatical representations of exemplary embodiments of a locking mechanism for coupling a sensor to the tubular components of the subsea structure, according to aspects of the present disclosure.
Figure 10:
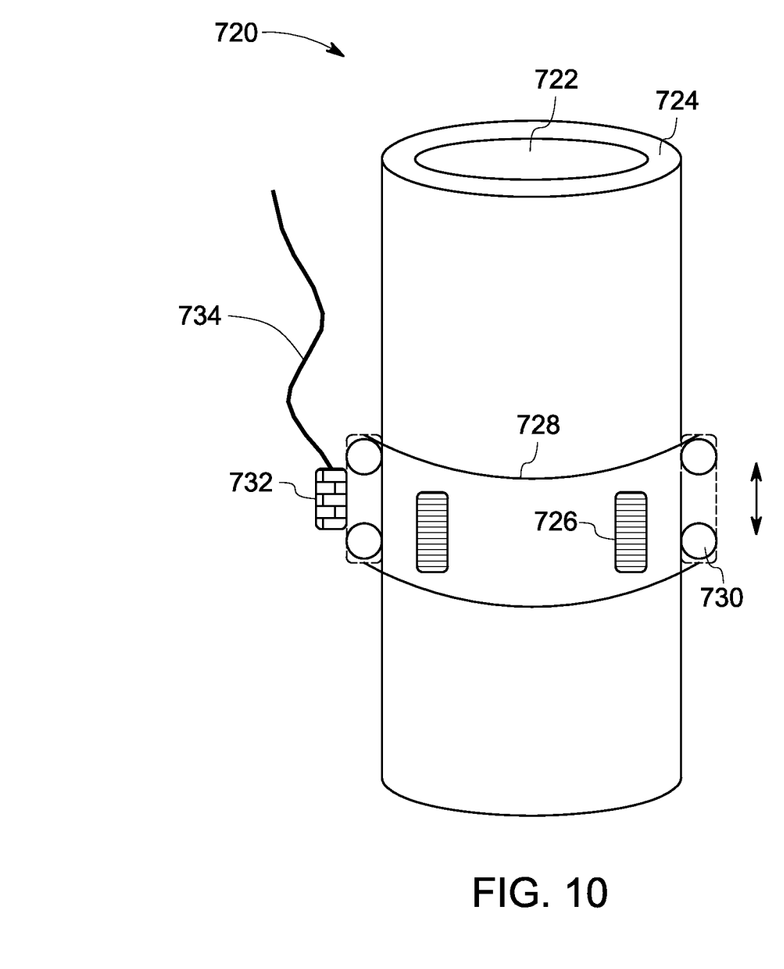

Turning now to FIGS. 9 and 10, diagrammatical representations of exemplary locking mechanisms for coupling a sensor, such as the sensor 106 of FIG. 1, to the tubular component of the subsea structure, according to aspects of the present disclosure, is depicted. Particularly, the locking mechanism may be employed to operatively couple a sensor in close proximity to a riser.

FIG. 9 depicts a diagrammatical representative 700 of a locking mechanism for locking a sensor in close proximity to a riser. The system 700 of FIG. 9 may include a riser 702 with a polymer and/or a cement coating 704. A sensor 706 may be secured to the coating 704 by employing a mechanical belt such as a clamp-on belt 708. Similarly, the sensor 706 may also be coupled to the coating 704 by using a mechanical fastener 710, such as, but not limited to, a screw and a bolt. In one example, the sensor 706 may be coupled to the riser 702 and may be embedded inside the coating 704. Also, the sensor 706 may be coupled to the riser 702 and/or coating 704 by employing adhesives.

Referring now to FIG. 10, a diagrammatical representation 720 of another embodiment of locking mechanism for locking a sensor 726 in close proximity to a riser 722 is depicted. The sensor 726 may be operatively coupled in close proximity to the riser 722 by employing a crawler assembly 728. Furthermore, a coating 724 may be disposed on the outer periphery of the riser 722. In one example, the sensor 726 may be coupled to the riser 722 or the coating 724 by employing a remotely operated device. The crawler assembly 728 may include a motor 730. The motor 730 may aid in moving the crawler assembly 728 along a length of the riser 722. Furthermore, the crawler assembly 728 may be controlled by employing a controller 732, such as the controller 110 of FIG. 1. The controller 732 may be configured to control the motion of the crawler assembly 728. Also, a communication link and/or power supply may be provided by employing a cable 734. Alternatively, the communication link and/or power supply may be provided by employing a wireless link. Although the examples of FIGS. 9 and 10 depict embodiments of a locking mechanism for locking the sensor in close proximity to the riser, similar locking mechanisms may be employed for locking the sensor to the flow-lines, subsea umbilical, and other tubular component of the subsea structure.

Figure 11:
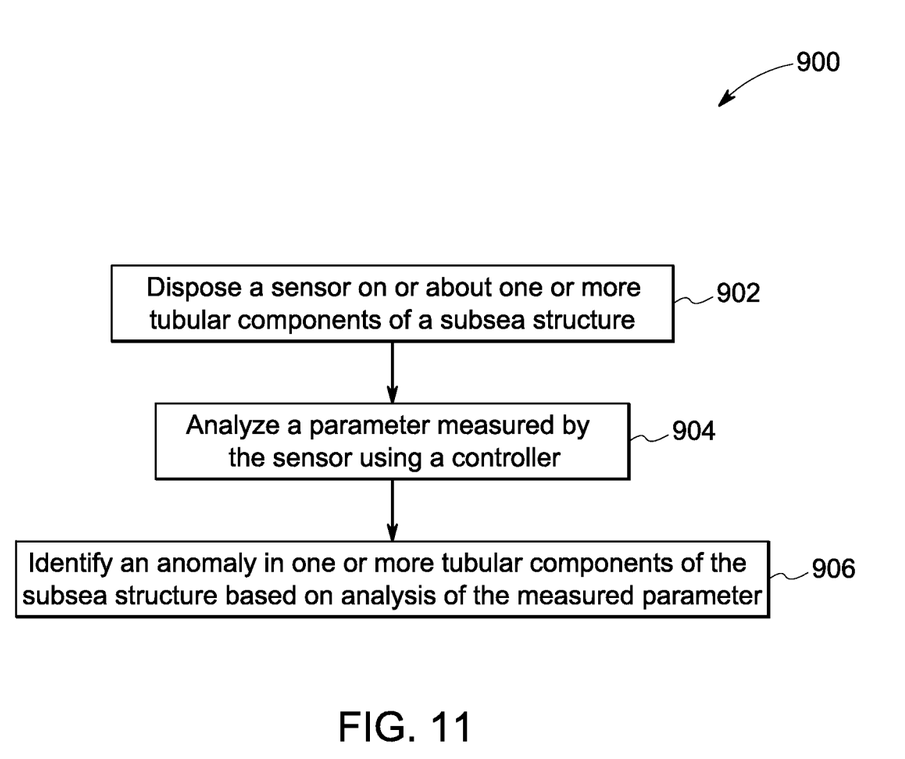
FIG. 11 is a flow chart representing a method of monitoring the tubular components of the subsea structure, according to aspects of the present disclosure.

FIG. 11 is a flow chart 900 depicting a method for monitoring a tubular component of the subsea structure, according to aspects of the present disclosure. The method is described with respect to FIGS. 1-10. At step 902, a sensor 106 may be disposed on or about a riser 114, a flow-line 116, a subsea umbilical 118, and other tubular components of the subsea structure. More particularly, the sensor 106 may be disposed on the outer periphery of the riser 114, the flow-line 116, the subsea umbilical 118, and other tubular components of the subsea structure. The sensor 106 may be configured to measure a parameter. The parameter may include a pressure, compression stress, hoop stress, residual stress, longitudinal stress, tensional stress, bending stress, torque induced stress, and equivalents thereof. In one embodiment, the parameter may include a signature that is representative of a variation in pressure with time in the riser. Additionally, the sensor 106 may be locked on to the one or more of the riser 114, the flow-line 116, and other tubular components of the subsea structure via a locking mechanism, such as the locking mechanisms mechanical fastener 710 and crawler assembly 728.

Furthermore, at step 904, the measured parameter may be analyzed by using a controller, such as controller 110 of FIG. 1. The analysis of the measured parameter may include comparing the measured parameter with a threshold value. In one embodiment, the threshold value may include a signature that is representative of a variation in pressure with time under normal operating conditions of the riser 114 and/or other components such as the flow-lines 116 and subsea umbilicals 118 or in the absence of any anomalies in the riser 114 and/or other components of the subsea structure. In one non-limiting example, the threshold value may include stress measured or calculated under normal operating conditions of the riser 202. Also, in one example, the threshold value may be stored in the controller.

At step 906, an anomaly in the riser 114 and/or other components may be identified based on analysis of the measured parameter. In one embodiment, the anomaly in the riser 114 and/the other tubular components of the subsea structure may be identified by employing one or more of an analytical model, a physics based model, and a self-learning mechanism for analyzing the parameter. As previously noted, the term anomaly, may include a condition that could lead to a fault in one or more of the riser 114, the flow-line 116, and other tubular components of the subsea structure.

In one embodiment, on identification of any anomalies in one or more tubular components of the subsea structure, an alarm or an indicator may be generated. Also, once the anomaly in the riser 114, the flow-line 116, and other tubular components of the subsea structure are identified, the controller may be configured to regulate the pressure and/or stress in the riser 114, the flow-line 116, and other tubular component of the subsea structure to avoid further variation in pressure and/or stress in the tubular components of the subsea structure. In one example, the controller may include in-built intelligence to control the pressure/stress in the tubular components of the subsea structure. Alternatively, once the anomaly in the riser, the flow-line, and other tubular components of the subsea structure are identified, an operator may manually regulate the pressure and/or stress in the riser 114, the flow-line 116, and the like.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The various embodiments of the system and method for monitoring a subsea structure described hereinabove aid in enhancing the efficiency of monitoring a riser, a flow-line, and other tubular components of the subsea structure. Moreover, since the exemplary system and method utilize a magnetostrictive technique, the sensing is robust against aging, dirt, moisture, changes in the composition of the ambient fluid, and the like. In addition, since magnetostrictive properties vary with the mechanical properties of the riser, the flow-line, and other tubular components of the subsea structure, the usable lifetime, and the stability of the tubular components may be enhanced.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A system for monitoring a subsea structure, the system comprising:
a sensor disposed on or about one or more tubular components of the subsea structure, wherein the one or more tubular components of the subsea structure comprise a riser, a flow-line, and a subsea umbilical, and wherein the sensor comprises a fiber optic sensor configured to detect a change in a magnetic field and measure a parameter based on the change in the magnetic field; and
a controller operatively coupled to the one or more tubular components of the subsea structure and configured to detect an anomaly in the one or more tubular components of the subsea structure.

2. The system of claim 1, further comprising an energy harvesting unit operatively coupled to the sensor and configured to energize the sensor.

3. The system of claim 2, further comprising a communication unit operatively coupled to the sensor and configured to transmit or receive the parameter measured by the sensor.

4. The system of claim 3, wherein the energy harvesting unit and the communication unit are operatively coupled to the sensor using a wired connection, a wireless connection, or a combination thereof.

5. The system of claim 2, wherein the energy harvesting unit is configured to generate electricity using vibrations of the one or more tubular components of the subsea structure, a temperature variation of the one or more tubular components of the subsea structure, light, sea water motion, or combinations thereof.

6. The system of claim 1, wherein the controller is further configured to:
control operation of the sensor for measuring pressure, flow, and stress in the one or more tubular components of the subsea structure; and
regulate one or more of the pressure, flow, and stress in the one or more tubular components of the subsea structure.

7. The system of claim 1, wherein the sensor further comprises a magnetostrictive sensor, a magnetic sensor, an acoustic transducer, a temperature sensor, or combinations thereof.

8. The system of claim 1, wherein the one or more tubular components of the subsea structure comprise one or more segments with sensing capability.

9. The system of claim 8, wherein the one or more segments with sensing capability comprise one or more magnetically encoded regions.

10. The system of claim 9, wherein the one or more magnetically encoded regions comprise a plurality of magnetized lines with at least two polarities formed along a length of the one or more tubular components of the subsea structure.

11. The system of claim 9, wherein the one or more magnetically encoded regions comprise a plurality of magnetized lines with at least two polarities in a spiral configuration around the one or more tubular components of the subsea structure.

12. The system of claim 11, wherein the fiber optic sensor is wound along the plurality of magnetized lines in a spiral configuration around the one or more tubular components of the subsea structure.

13. The system of claim 1, further comprising a coating disposed on the one or more tubular components of the subsea structure.

14. The system of claim 13, wherein the sensor is embedded in the coating, disposed on the coating, or a combination thereof.

15. The system of claim 1, further comprising a locking mechanism configured to operatively couple the sensor to the one or more tubular components of the subsea structure.

16. The system of claim 15, wherein the locking mechanism comprises a crawler motor, a remotely operated device, an adhesive, a mechanical belt, a mechanical fastener, or combinations thereof.

17. A method for monitoring a subsea structure, the method comprising:
disposing a sensor on or about one or more tubular components of the subsea structure, wherein the one or more tubular components of the subsea structure comprise a riser, a flow-line, and a subsea umbilical, and wherein the sensor comprises a fiber optic sensor configured to detect a change in a magnetic field and measure a parameter based on the change in the magnetic field;

analyzing the measured parameter using a controller; and
identifying an anomaly in one or more of the riser, the flow-line, and the subsea umbilical based on an analysis of the measured parameter.

18. The method of claim 17, further comprising magnetizing one or more of the riser, the flow-line, and the subsea umbilical.

19. The method of claim 18, wherein magnetizing one or more of the riser, the flow-line, and the subsea umbilical comprises magnetizing one or more of the riser, the flow-line, and the subsea umbilical in a spiral configuration.

20. The method of claim 18, wherein magnetizing one or more of the riser, the flow-line, and the subsea umbilical comprises magnetizing one or more of the riser, the flow-line, and the subsea umbilical in a longitudinal configuration.

21. The method of claim 18, wherein magnetizing one or more of the riser, the flow-line, and the subsea umbilical comprises applying a determined value of an electrical current, a determined value of the magnetic field, or a combination thereof to one or more of the riser, the flow-line, and the subsea umbilical.

22. The method of claim 17, wherein the parameter comprises a pressure, a load, compression stress, residual stress, longitudinal stress, tensional stress, bending stress, torque induced stress, a flow property of a production fluid, or combinations thereof.

23. A system, comprising:
a monitoring subsystem configured to monitor one or more tubular components of a subsea structure, wherein the one or more tubular components of the subsea structure comprise a riser, a flow-line, and a subsea umbilical, and wherein the monitoring subsystem comprises:
 a sensor disposed on or about the one or more tubular components of the subsea structure, wherein the sensor comprises a fiber optic sensor configured to detect a change in a magnetic field and measure a parameter associated with the one or more tubular components of the subsea structure based on the change in the magnetic field;
 a controller operatively coupled to the one or more tubular components of the subsea structure and configured to detect an anomaly in the one or more tubular components of the subsea structure;
an energy harvesting unit operatively coupled to the monitoring subsystem and configured to energize the sensor; and
a communication unit operatively coupled to the monitoring subsystem and configured to transmit or receive the parameter measured by the sensor.

\* \* \* \* \*